Oct. 7, 1969 S. B. FIELD 3,471,040
ROOF AND CARGO HANDLING ASSEMBLY FOR DOCKS AND THE LIKE
Filed April 19, 1966 2 Sheets-Sheet 1
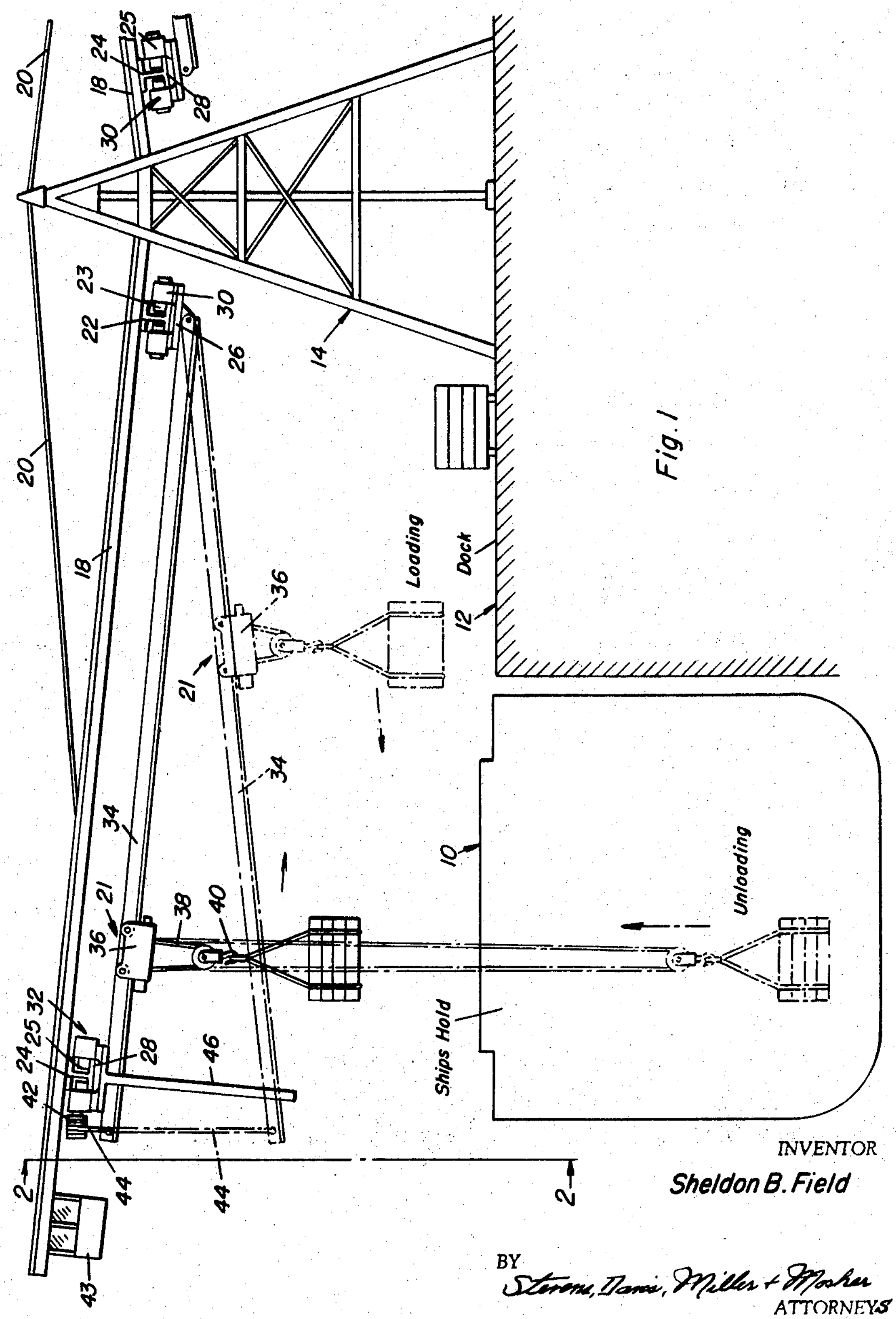
INVENTOR
Sheldon B. Field
BY
Stevens, Davis, Miller & Mosher
ATTORNEYS ROOF AND CARGO HANDLING ASSEMBLY FOR DOCKS AND THE LIKE
Filed April 19, 1966 2 Sheets-Sheet 2
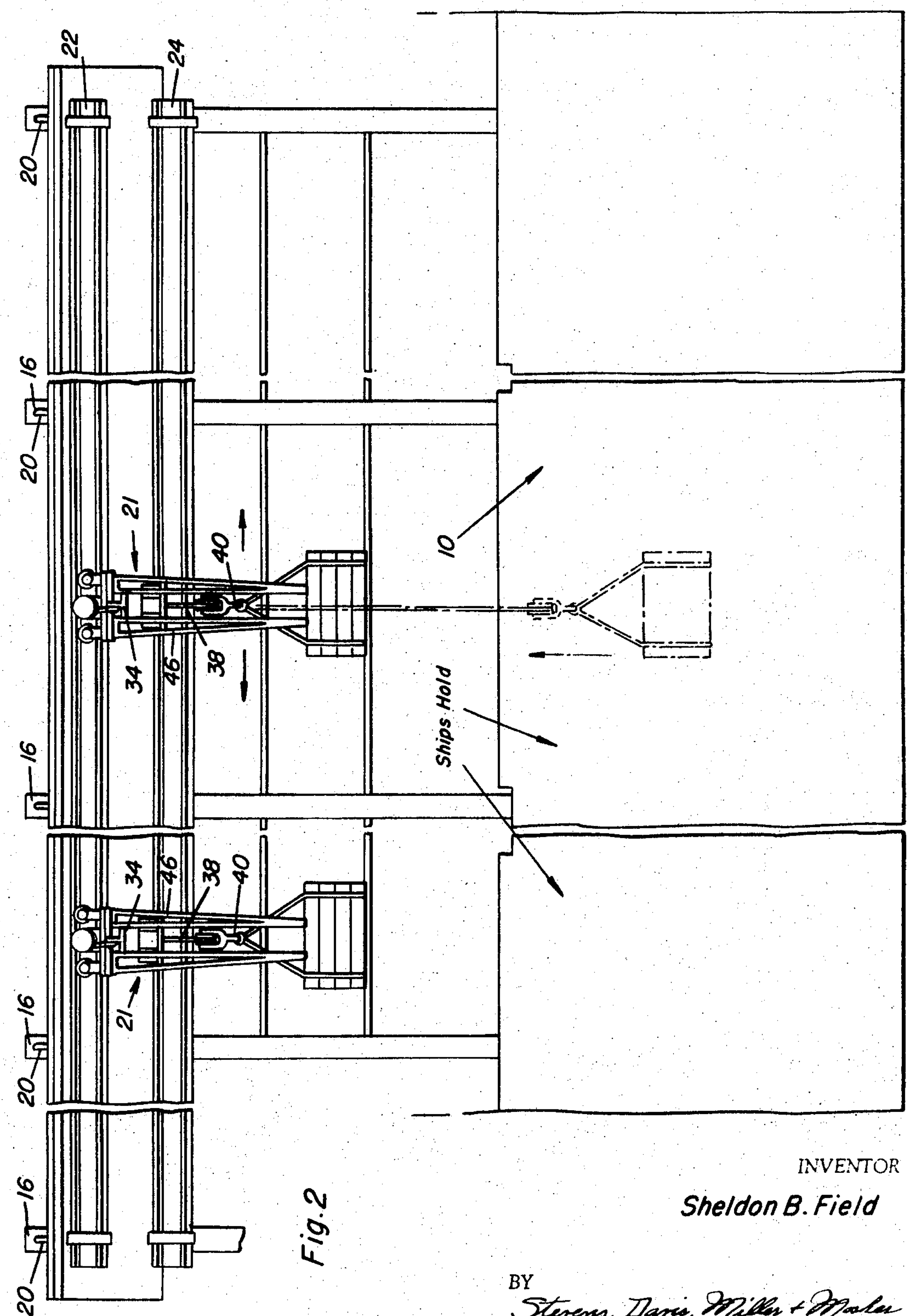
INVENTOR
Sheldon B. Field
BY
Stevens, Davis, Miller & Mosher
ATTORNEYS United States Patent Office 3,471,040
Patented Oct. 7, 1969

3,471,040

ROOF AND CARGO HANDLING ASSEMBLY FOR DOCKS AND THE LIKE

Sheldon B. Field, Floral Park, N.Y., assignor to John J. McMullen Associates, Inc., New York, N.Y., a corporation of New York Filed Apr. 19, 1966, Ser. No. 543,724
Int. Cl. B63b *27/00*
U.S. Cl. 214—14 4 Claims

ABSTRACT OF THE DISCLOSURE

A protective roof and cargo handling apparatus used on docks and the like including a protective cantilever roof supported on the dock and extending out over the ship to protect same from weather conditions and an improved cargo handling system including a pair of spaced rails mounted to the underside of the roof and extending parallel to the ship. At least one transverse rail is connected therebetween to support a traveling carriage which lifts and carries cargo between the dock and ship. One end of the transverse rail is pivoted, and the other end is vertically movable so that the carriage moves downhill when carrying cargo from the dock to the ship and when carrying cargo from the ship to the dock.

The present invention relates to a protective roof and freight handling apparatus for use on docks or the like, and more particularly, to a new and improved roof arrangement mounted on a dock and extending over a docked ship to protect the same from inclement weather and including a cargo handling apparatus to load and unload said ship.

It is presently conventional to construct docks with a roof which protects the cargo handling spaces of the dock from inclement weather. However, these docks do not protect the exposed decks and holds of the ship from rain, sleet or snow during loading and unloading operations. Consequently, with conventional arrangements, loading and unloading must be performed during periods of good weather and in the event the hatches are open during inclement weather, cargo handling is slowed down and the cargo could be water damaged.

It is an object of the present invention to solve the above problem by providing a protective cantilevered roof supported on the dock and extending out over the ship to protect the same from rain, sleet, snow and the like.

Conventional dockside handling gear comprises cranes mounted on either the ship or dock which are pivoted to lift and carry cargo between the ship's hold and the dock. But cranes of this type have large and heavy booms which must be moved to transfer the cargo from one location to another.

Another feature of the present invention is to provide one or more cargo handling assemblies which may be mounted to the underside of the roof. Each assembly has a relatively small rail mounted carriage which lifts and moves the cargo. The unique design of the cargo handling assembly enables the carriage to run downhill whenever it is loaded so that the speed and efficiency of handling is greatly increased.

It is therefore another object of the present invention to provide a new and improved cargo handling system which includes a pair of spaced rails mounted below the underside of the roof and extending parallel to the ship. At least one transverse rail is connected therebetween to support a travelling carriage which lifts and carries cargo between the dock and ship. One end of the transverse rail is pivoted and the other end is vertically movable so that the hoist can run downhill when carrying cargo from the dock to the ship and when carrying cargo from the ship to the dock.

Other and further objects of the present invention will become apparent with the following detailed description when taken in view of the appended drawings in which:

FIG. 1 is a front elevation of the roof arrangement according to the present invention and showing its relation to the ship and dock; and FIG. 2 is a longitudinal vertical section taken along line 2—2 of FIG. 1.

With reference to the drawings in detail, ship 10 is secured in the conventional manner to dock 12 upon which is supported the cantilevered roof arrangement 14 of the present invention. The arrangement comprises a number of longitudinally aligned, upstanding A-frames 16 spaced along dock 12. A pair of cantilevered roofs 18 are supported by A-frames 16, and each has its inner edge connected to the A-frames and its outer edge extending upward and outward to a position vertically above and beyond the outer limits of the ship. The support of roofs 18 is aided by steel cables 20 which have their opposite ends connected to opposite roofs 18 and have their centers supported near the tops of A-frames 16. It is preferred that roof 18 extend outward and upward at a small angle relative to the horizontal so that that portion of roof 18 above ship 10 clears any upstanding equipment on the main deck thereof.

With this arrangement, roofs 18 provide shelter for ship 10 during all kinds of weather so that loading and unloading are not hampered or prevented by inclement conditions.

The cargo handling apparatus according to the present invention includes a number of hoist units 21 supported by a pair of parallel rails 22 and 24 suitably mounted below roof 18. Each hoist unit 21 is movable in the fore and aft direction so that it can be aligned with and work one or more of the holds of ship 10. For this purpose, a conventional control cab 43 is provided for each hoist unit 21 at a visual advantage point below roof 18. With this arrangement, the operator of each unit 21 can not only see down into the hold he is working, but he also has a clear view of the dock.

Each unit 21 comprises a pair of motor driven carriages 30 and 32 which have rollers 23 and 25 supported by flanges 26 and 28 of rails 22 and 24. A transverse rail 34 is supported by carriages 30 and 32 so that when the carriage motors are energized the entire rail 34 moves in the longitudinal direction relative to the dock and ship.

A conventional Brown Hoist or any other suitable type of carriage-type lifting mechanism 36 is supported by and travels along a length of rail 34. Suitable stops (not shown) may be attached to rail 34 to prevent carriage 36 from running into carriages 30 and 32. The carriage hoist 36 includes appropriate cables 38 and cargo engaging means 40 to facilitate the handling of crates, cartons, nets, and the like.

In order to increase the speed and efficiency of cargo movement and to enable the use of less power for cargo handling, the dockside end of rail 34 of each unit 21 is pivotably mounted to carriage 30, and carriage 32 includes winch 42 which operates a cable 44 having its free end connected to the outer end of rail 34. A pair of elongated metal guides or struts 46 are dependingly mounted from the bottom of carriage 32 and straddle the outer end of rail 34 in order to prevent rail 34 from swaying when it is lowered by winch 42. With this unique arrangement, the outer end of rail 34 is raised when the ship is being unloaded so that Brown Hoist 36, when loaded, runs downhill toward dock 12. After Brown Hoist 36 deposits its load on dock 12, it moves unloaded up rail 34 so that it can engage and lift another piece of cargo from the ship's hold and repeat the process.

When ship 10 is to be loaded, winch 42 lowers the outer end of rail 34 to the position shown in phantom in FIG. 1. Now, Brown Hoist 36 lifts cargo from the dock 12 and *again runs downhill* along rail 34 to a position above the hatch of ship 10. The cargo is lowered into the hold and cables 38 disengage therefrom. Brown Hoist 36, then unloaded, moves up rail 34 to a position above dock 12 where it again lifts cargo for loading.

By having several units 21, several holds of the ship can be simultaneously loaded and unloaded in the manner described above. Although only two units have been shown in the drawings, it should be understood that any suitable plurality of units 21 can be used and it is preferred to have as many units 21 in operation as there are holds in the ship being loaded and unloaded.

Thus, there has been disclosed herein a roof arrangement for docks or the like which protects vessels from inclement weather and includes an efficient and rapid cargo handling assembly which loads and unloads a ship in a shorter time than can conventional assemblies.

It should be understood that various modifications can be made to the herein disclosed example of the present invention without departing from the spirit and scope thereof.

What is claimed is:

1. A roof and freight handling arrangement in combination with a dock, said arrangement comprising a plurality of A-frames spaced longitudinally of each other and each having its legs aligned transversely on said dock, a pair of cantilevered roofs each mounted on opposite sides of said plurality of A-frames and each extending upwardly and outwardly over said dock and having an outer portion spaced vertically above the space occupied by the ship when it is tied to the dock, a cable connected to each of said A-frames and having opposite ends connected to one of said roofs, a cargo handling assembly mounted to each said roof and comprising an inner rail mounted to and beneath the roof near the inner edge thereof and extending longitudinally to said ship and an outer rail mounted to and beneath the roof near the outer edge thereof and extending longitudinally relative to said ship, a first carriage movably mounted on said inner rail and having roller and drive means for moving said first carriage along said inner rail, a second carriage mounted on said outer rail and having roller and drive means for moving said second carriage along said second rail, a transverse rail having a portion thereof above the dock and a portion thereof above the ship position, the inner end of said transverse rail being pivotally supported by said first carriage, means mounted to said second carriage and coupled to said transverse rail near the outer end thereof to raise and lower said outer end between an upper position in which said transverse rail extends outwardly and upwardly and a lower position in which said transverse rail extends outwardly and downwardly, and cargo lifting means movable on said transverse rail and including drive means for moving said cargo lifting means along the portions of said transverse rail above said dock and above said dock-ship position.

2. The roof and freight handling arrangement as set forth in claim 1 wherein at least two such cargo handling assemblies are provided and wherein a control cab associated with each said assembly is mounted beneath said roof at the outer upper part thereof.

3. A roof arrangement for use on a dock to which a ship is tied, said arrangement comprising a supporting structure spaced from the edge of the dock near the ship and being mounted on the deck and extending longitudinally thereon, said supporting structure comprising at least one A-frame having its legs arranged transversely on the dock, a second roof having its inner end connected to said A-frame and being positioned on the opposite side of said A-frame as said first-mentioned roof and being cantilevered with said first mentioned roof, an elongated roof having its inner end mounted to said supporting structure and extending outward over said ship to a position spaced above the side of the hull of said ship furthest from said dock so that said roof protects the ship from inclement weather conditions sufficiently to enable loading and unloading thereof at all times, an inner and outer rail mounted to the lower side of said roof and extending longitudinally thereon, a first carriage mounted on said outer rail and a second carriage mounted on said inner rail and a transverse rail having one end pivotally connected to one of said carriages, means mounted on the other of said carriages engaging said transverse rail at a position removed from said one end for raising and lowering said transverse rail between an upper position in which the transverse rail extends upward and outward and a lower position in which the transverse rail extends downward and outward, and freight lifting means movable on said transverse rail for loading and unloading said ship, whereby said freight lifting means can run downhill whenever carrying freight to and from the ship, and said transverse rail can be moved by said carriages longitudinally of the ship.

4. An arrangement mounted on a dock for loading and unloading a ship tied thereto, said arrangement comprising an elongated rail, cargo lifting means movable on said rail, means stationary with said dock supporting said rail above said dock and in a plane generally transverse to the longitudinal axis of said ship, a portion of said rail being above the dock and a portion of said rail being above the ship, and means connected to said supporting means and said rail for moving the rail between an upper position in which said rail extends upwardly and outwardly and a lower position in which said rail extends downwardly and outwardly, said supporting means comprising an upwardly and outwardly extending roof having its inner portion above the dock and its outer portion extending above the ship, an inner rail mounted to and beneath said roof and extending longitudinally thereon and a spaced outer rail mounted to and beneath said roof and extending longitudinally thereon, a first carriage movable on said inner rail and a second carriage movable on said outer rail, said transverse rail having one portion pivoted to one of said first and second carriages, said means for moving said transverse rail between upper and lower positions being carried by the other of said first and second carriages and being connected to another portion of said transverse rail, said last-mentioned means being capable of selectively moving said other portion upwardly or downwardly relative to said one portion of said transverse rail.

References Cited

UNITED STATES PATENTS

| | | | |
|---|---|---|---|
| 809,618 | 1/1906 | Keech | 212—75 X |
| 1,476,557 | 12/1923 | Travell. | |
| 2,887,235 | 5/1959 | Ladner | 214—14 X |

FOREIGN PATENTS

| | | |
|---|---|---|
| 473,227 | 7/1952 | Italy. |

GERALD M. FORLENZA, Primary Examiner

FRANK E. WERNER, Assistant Examiner

U.S. Cl. X.R.

212—75; 104—164